Nov. 26, 1935.  J. E. GAEDE  2,022,193
FLOAT FOR A FISHING LINE
Filed April 20, 1934
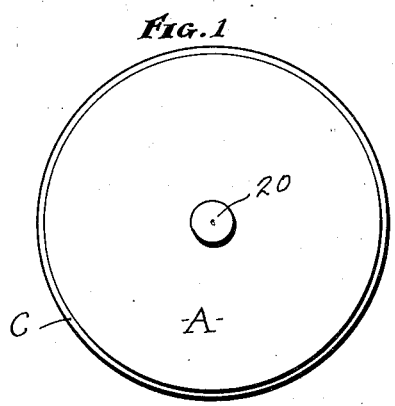
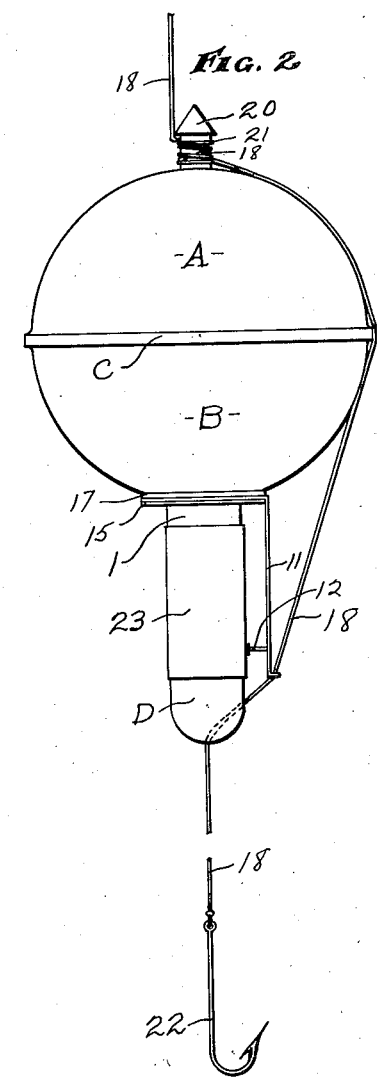
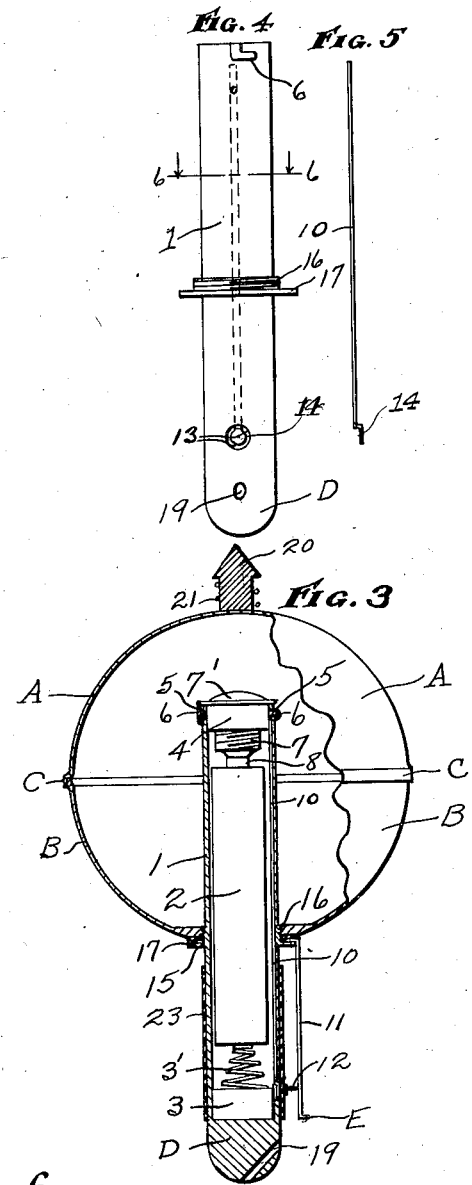
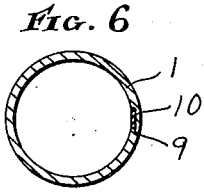
INVENTOR.
John E. Gaede
BY *A. G. Charles*
ATTORNEY.

Patented Nov. 26, 1935

2,022,193

UNITED STATES PATENT OFFICE 2,022,193

FLOAT FOR A FISHING LINE

John E. Gaede, Newton, Kans., assignor of thirty per cent to W. S. Goertzen, Newton, Kans.

Application April 20, 1934, Serial No. 721,452

2 Claims. (Cl. 43—17)

My invention relates to a float for a fishing line.

The object of my invention is to provide a float having an electric lamp contained therein and adaptable for night or day fishing, the float being translucent in part but not barring transparency, in which case the lower portion may be opaque or partially so.

A further object of my invention is to provide a hollow float for a fishing line having a lamp and battery to electrically energize the same and a switch to make and break the current concealed by the constituent elements forming the float to avoid contact of water with the electric arrangement.

A still further object of my invention is to provide a simple and efficient means to connect the fishing line to the float for a selected depth of a hook attached to the lower end of the line and also the said line in threaded contact with an element as actuating means for the switch when tensioned by the jerk of a fish upon the hook.

A still further object of my invention is to provide a float for a fishing line having a simple efficient means for the replacement of lamp or battery when either of the same becomes deteriorated.

These and other objects will hereinafter be more fully explained, reference being had to the accompanying drawing forming a part of this specification and in which;

Fig. 1 is a plan or top view of the float.

Fig. 2 is a side view showing the line as engaged therewith.

Fig. 3 is a similar side view to Fig. 2 partly in section, the line being removed.

Fig. 4 is a side view of the lamp and battery housing taken at right angles to that shown in Figs. 2 and 3, the switch being shown by dotted lines.

Fig. 5 is a side view of the switch element a part from the housing.

Fig. 6 is an enlarged cross section thru the housing taken on line 6—6 in Fig. 4, the battery being removed.

The invention herein disclosed consists of a spherical float and may be constructed in two parts A and B connected by over-lapping each half at a center zone C, securing the same water tight, preferably the said spherical float is made of celluloid or the like, solid texture and impervious to the water, the portion A may be clear or translucent, the latter being preferred, while the portion B is opaque all at the discretion of the manufacturer.

The object however is to provide a hollow spherical float that illumination produced within will be visible thru the upper hemispherical portion thereof as at A while the lower portion B is of opaque substance or may be rendered so by an overcoating internally or externally applied.

Diametrically positioned and extending into the said float is a housing 1 preferably made of insulation material and being hollow to receive a battery 2 contained therein, the said battery being removable when exhausted, the lower end portion of the said housing extends outward and is closed at the lower extremity thereof as shown at D to form a seat for a metal filling 3 having a spring 3' positioned thereon and upon which the said battery will seat. Positioned within the inner or upper end of the housing is a lamp socket 4 secured by diametrically positioned pins 5 extending therefrom and adapted to engage in depressed channels 6 respectively, the entrance portions of which are in parallelism with the axis of the housing by which means when the said pins are entered, pressed downward and turned snugly into a right angle positioned portion of the channel they secure the socket against removal.

It will be understood that the said socket is threaded internally to engage with the threaded base 7 of a lamp 7' the said base portion snugly engaging on the upper end contact 8 of the battery, tensioning the same upon the said spring 3'.

Positioned within the housing and seated loosely in a channel 9 is a switch element 10 the upper end of which is secured to the said socket and extends downward thru said channel and is adapted to contact with the said spring 3' when forced inward by a resilient arm 11 having a pin 12 laterally extending from near the lower end thereof and in registry with an aperture 13 and is adapted to engage upon a disc-like portion 14 at the lower end of the said switch 10, the disc portion also being in registry with the said aperture and constitutes means to close the circuit when forced inward to contact as above stated when the said pin is actuated by means later described.

As a means to secure the said battery housing to the float, I have arranged an annular flange 15 integral therewith, the said housing being threaded upwardly from said flange to engage with the threaded aperture 16 through which the battery extends and being so arranged will cause snug engagement upon a gasket 17 and an annular member to which the said arm 11 is integrally joined to secure the pin 12 in working position as previously described while the gasket forms a water tight sealing means therefor, it being understood that the said annular element of the arm is free to turn to proper adjustment when the housing is unscrewed.

At the outer end extremity of the said arm 11 is a portion E positioned at right angles thereto and being apertured to threadedly engage a fishing line 18 from which point the said line abruptly bends to pass loosely through an aperture 19 obliquely extending through the lower extremity of the battery housing and terminating at the axis thereof, the said line being so positioned and secured against longitudinal movement at the opposite or upper side of the float by its engagement with a stud 20 axially aligned with the battery housing and secured to the float, the attaching or binding means for the line is through the medium of a spirally wound spring 21 about the neck of the stud and under which the said line is frictionally retained to a desired position for the depth of the hook 22 in the water, and being so detained, a jerk upon the hook by a fish or the like will tend to straighten the line at the aperture of the arm moving the same inward so that the inner end of the said pin 12 will compress the disc portion of the switch to engagement with the element 3 as closing means for the circuit that will transmit through the spring.

It will be understood that a flexible sleeve element 23 will tightly engage around the outward extension of the housing as water proof sealing means for the said aperture 13 at which point the said pin will contact therewith, stretching that portion of the said flexible element to contact with the switch in response to the pin movement for the purpose above stated, the said sleeve being replaceable when deteriorated and the arm spring to a desired position to avoid constant closing of the switch.

While I have shown a spherical body for the float I do not wish to be confined to the same as other forms may be employed but in all events the downward and outward extension of the battery housing will function as a plummet for the float against buoyancy, and such other modifications may be employed as lie within the scope of the appending claims and what I claim as new and desire to secure by Letters Patent is:—

1. In a float for a fishing line, a battery and tubular housing therefor, an electric lamp positioned in the end of the housing in contact with the battery, a switch positioned in the housing and a resilient arm carried by the housing, the arm having a pin spaced from the free end thereof as actuating means for the switch and means to actuate the arm.

2. In a float for a fishing line, a hollow float, one portion being translucent, the other opaque, means on the translucent portion to which a line may be attached, a housing insertable in the float through the opaque portion, the housing having a battery therein and a lamp in connection therewith carried by the end portion of the housing and a switch positioned in the housing, one part thereof being connected to the lamp, the other part being in registry with an aperture communicating with the interior of the housing, the said other part being adapted to connect with the battery when forced inward, means to secure the housing fluid tight with the float, a flexible sleeve to snugly engage on the outer extending portion of the housing as sealing means for the aperture, a flexible arm secured at one end to the housing, the other end having an aperture therethrough and a pin on the arm extending toward the housing and in registry with the first mentioned aperture to cause flexing of the sleeve toward the switch thus closing the circuit, the outer extremity of the housing being apertured to receive a line passing through the aperture of the arm and which also is secured to the means positioned on the translucent portion of the float, all as and for the purpose specified.

JOHN E. GAEDE.